United States Patent

Lamkemeyer et al.

[11] Patent Number: 5,830,391
[45] Date of Patent: Nov. 3, 1998

[54] ADJUSTABLE, LEAK-FREE SEALING DEVICE FOR POLYMER DIES

[75] Inventors: Matthias Hubert Lamkemeyer, Steinfurt; Gerhard Theodor Huechter, Ahlen; Heinrich Moennig, Warendorf, all of Germany

[73] Assignee: E. I. du Pont de Nemours and Company, Wilmington, Del.

[21] Appl. No.: 684,283

[22] Filed: Jul. 17, 1996

[51] Int. Cl.$^6$ .................................................. B29C 47/92
[52] U.S. Cl. ..................... 264/40.1; 264/176.1; 425/141; 425/466
[58] Field of Search .................... 264/40.1, 40.5, 264/167, 176.1; 425/141, 466, 376.1, 382.4

[56] References Cited

U.S. PATENT DOCUMENTS

| | | |
|---|---|---|
| 2,859,475 | 11/1958 | Tornberg . |
| 3,067,464 | 12/1962 | Nicholson ................................ 425/466 |
| 3,238,563 | 3/1966 | Hoffman . |
| 3,293,689 | 12/1966 | Chiselko et al. . |
| 3,611,491 | 10/1971 | Rector . |
| 3,706,518 | 12/1972 | Bunte et al. ............................ 425/381 |
| 3,829,274 | 8/1974 | Melead .................................. 425/466 |
| 3,984,508 | 10/1976 | Solop ..................................... 425/466 |
| 4,283,168 | 8/1981 | Miller et al. ........................... 425/465 |
| 4,454,084 | 6/1984 | Smith et al. ........................... 425/141 |
| 4,863,361 | 9/1989 | Boos ..................................... 425/141 |
| 4,990,079 | 2/1991 | Lorenz .................................. 425/141 |
| 5,424,018 | 6/1995 | Paul et al. . |
| 5,451,357 | 9/1995 | Cloeren . |
| 5,456,869 | 10/1995 | Miles et al. ............................ 425/466 |

FOREIGN PATENT DOCUMENTS 26 08 063   9/1977   Germany ............................... 425/466

Primary Examiner—Mathieu D. Vargot
Attorney, Agent, or Firm—Hilmar L. Fricke

[57] ABSTRACT

The present invention provides an adjustable, leak-free sealing device for sealing the die orifice of a molten polymer die. The sealing device includes a sealing bar seated against and blocking a portion of the die orifice, a deckle holder slideably connected to one side of the die and extending under the die orifice, and a plurality of springs seated on the deckle holder and biasing the sealing bar against a portion of the die orifice. The springs have a combined spring force equal to or greater than the die orifice outlet pressure such that the sealing bar provides a leak-free seal along a portion of the die orifice.

10 Claims, 4 Drawing Sheets

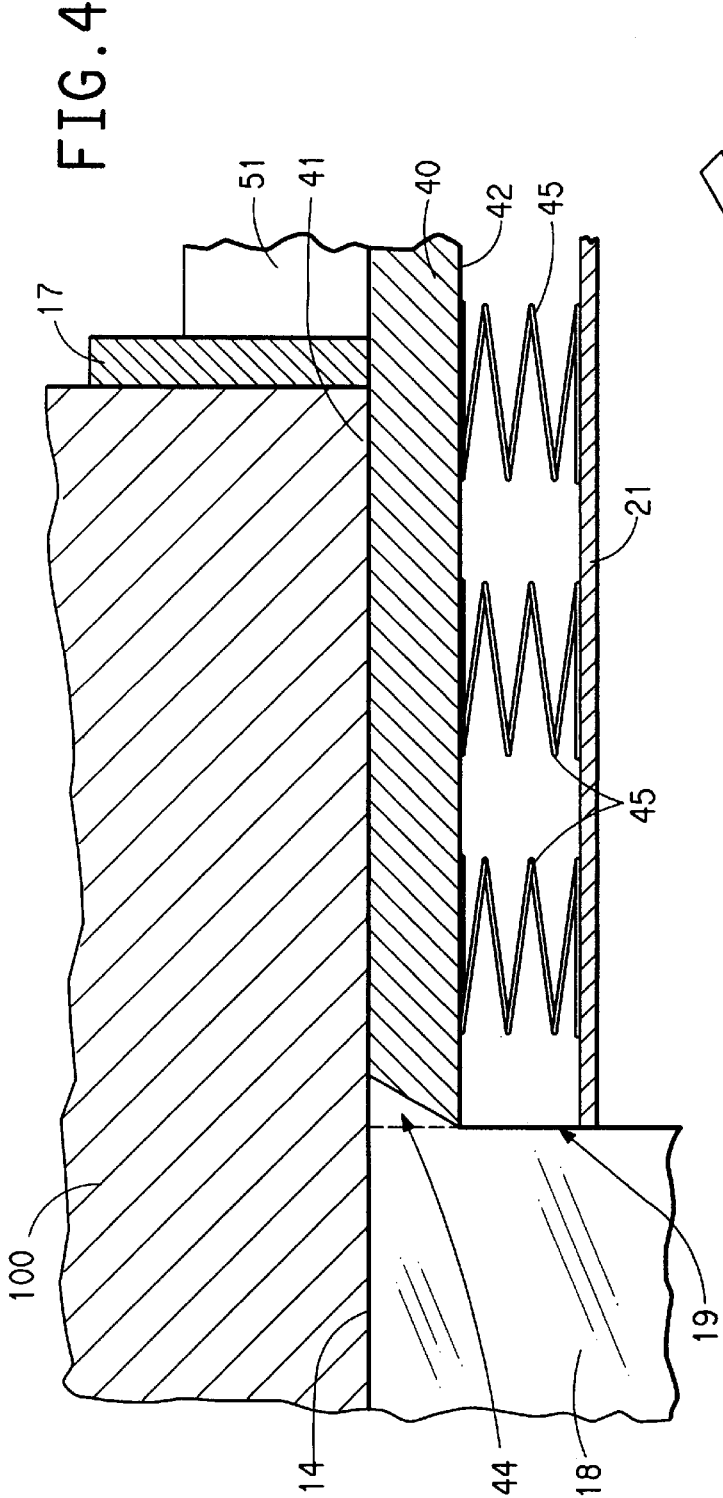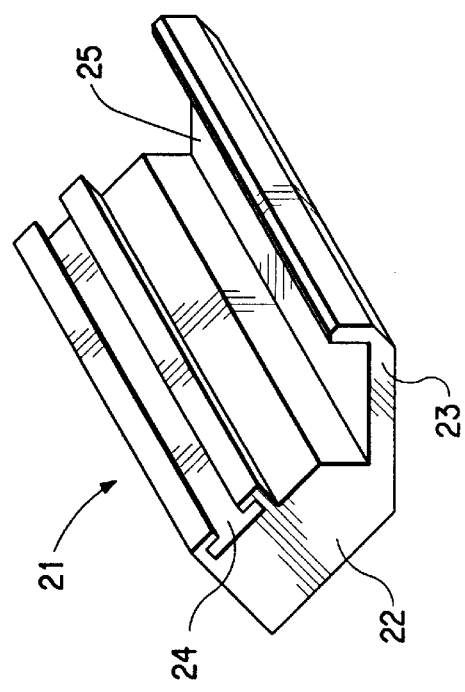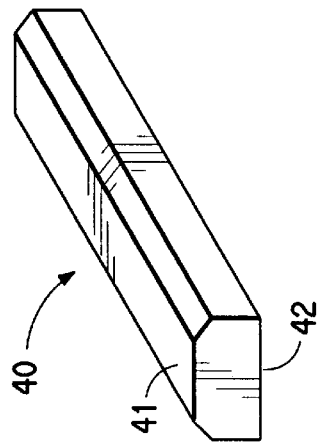

5,830,391

ADJUSTABLE, LEAK-FREE SEALING DEVICE FOR POLYMER DIES

BACKGROUND OF THE INVENTION

The present invention relates to extrusion dies for plasticized material and more particularly to an adjustable, leak-free sealing device for regulating the width of the plastic film or sheet extruded from dies having an orifice in the shape of a long narrow slit.

The process of extruding plastics to form a wide variety of articles is well established technology. Extrusion has been utilized to produce sheets, films, pellets, wire and cable coatings, and useful articles. Typically, a plastic material is fed to an extruder wherein the temperature is raised above the glass transition temperature of the plastic such that the plastic will flow. The molten plastic is mechanically forced through a shaping or extrusion die under a positive pressure or force.

A significant drawback associated with the extrusion of sheets of different widths is the need to change the extrusion dies when it is desired to vary the width or thickness of the plastic sheet being extruded. Removing the die and replacing it with a new die of different dimensions has proved to be cumbersome and cause a significant amount of downtime. It has also been necessary to stockpile dies of varying widths in order to satisfy the demands of the marketplace for sheets of varying widths.

Typically, a die comprises a pair of lips defining a die outlet orifice from which molten polymer is drawn to form a sheet. The distance between the lips is commonly referred to as the lip gap. One of the lips is typically a flexible lip which is connected to an adjusting means for varying the width of the lip gap, and thereby the thickness of the sheet.

The use of an adjustable deckle to block or close a portion of the die orifice, thereby altering the width of the die and the extruded article, has been disclosed in the art. Deckles may be internal, external, or an external/internal combination, and external deckles may be mounted on both sides of the die or from a single side of the die. The adjustable external deckles disclosed in the prior art, for example U.S. Pat. Nos. 2,859,475 to Tornberg, 3,293,689 to Chiselko et al., and 3,238,563 to Hoffman, use set screws to firmly lock the deckle into place and provide a leak-free seal. In order to adjust these deckles, the screws must first be loosened, the deckled moved, and the screws retightened to ensure a leak-free seal. It is readily apparent that the use of screws to hold the deckle in place is labor intensive, requiring manual loosening and retightening for each adjustment, thereby prohibiting the automation of sheet width adjustment.

The leak-free sealing device disclosed herein comprises a plurality of springs for biasing a sealing rod against the die orifice. The springs exert a constant force equal to or greater than the die orifice outlet pressure, thereby providing a leak-free seal. In contrast to the set screws employed in the prior art, the springs do not require manual loosening and tightening before and after each width adjustment. Thus, the leak-free sealing device disclosed herein can be readily incorporated into an automated sheet width adjustment system.

SUMMARY OF THE INVENTION

The present invention provides an adjustable, leak-free sealing device for sealing the die orifice of a molten polymer die. The sealing device comprises a sealing bar seated against and blocking a portion of the die orifice, a deckle holder slideably connected to one side of the die and extending under the die orifice, and a plurality of springs seated on the deckle holder and biasing the sealing bar against a portion of the die orifice. The springs have a combined spring force equal to or greater than the die orifice outlet pressure such that the sealing bar provides a leak-free seal along a portion of the die orifice.

In a preferred embodiment, the sealing bar is made from carbon fiber reinforced polytetrafluoroethylene. An edge of the sealing bar abuts the polymer sheet exiting the die, and preferably the abutting edge of the sealing bar has a negative slope, most preferably a negative slope of about 10°.

In order to facilitate changes in the width of the polymer sheet exiting the die, the sealing device may further comprise a driving means connected to the deckle holder such that the driving means slides the deckle holder. A computer may be connected to the driving means, thereby providing on-line control of the width of the polymer sheet. Integration of a deckle holder positioning means allows the computer to track the location of the sealing bar in relation to the die orifice. A die extension may be added to an end of the die to prevent rotational movement and lateral deflection of the sealing device.

The present invention also provides a method of controlling on-line the width and thickness of a sheet of polymer exiting the die, comprising the steps of supplying a die having an adjustable lip to control the lip gap, modifying the die to include the sealing device describe herein, integrating the adjustable lip and the sealing device with a computer, and entering a desired sheet width and thickness into the computer, whereby the computer monitors and adjusts the width of the sheet by sliding the sealing bar along the die orifice and the thickness of the sheet by adjusting the lip gap such that the desired sheet width and thickness are obtained.

BRIEF DESCRIPTION OF THE DRAWINGS

FIG. 4 is a cross-sectional view taken along line IV—IV of FIG. 3.

FIG. 5 is a perspective view of the sealing bar described herein.

FIG. 6 is a perspective view of the deckle holder described herein.

DETAILED DESCRIPTION

Figure 1:
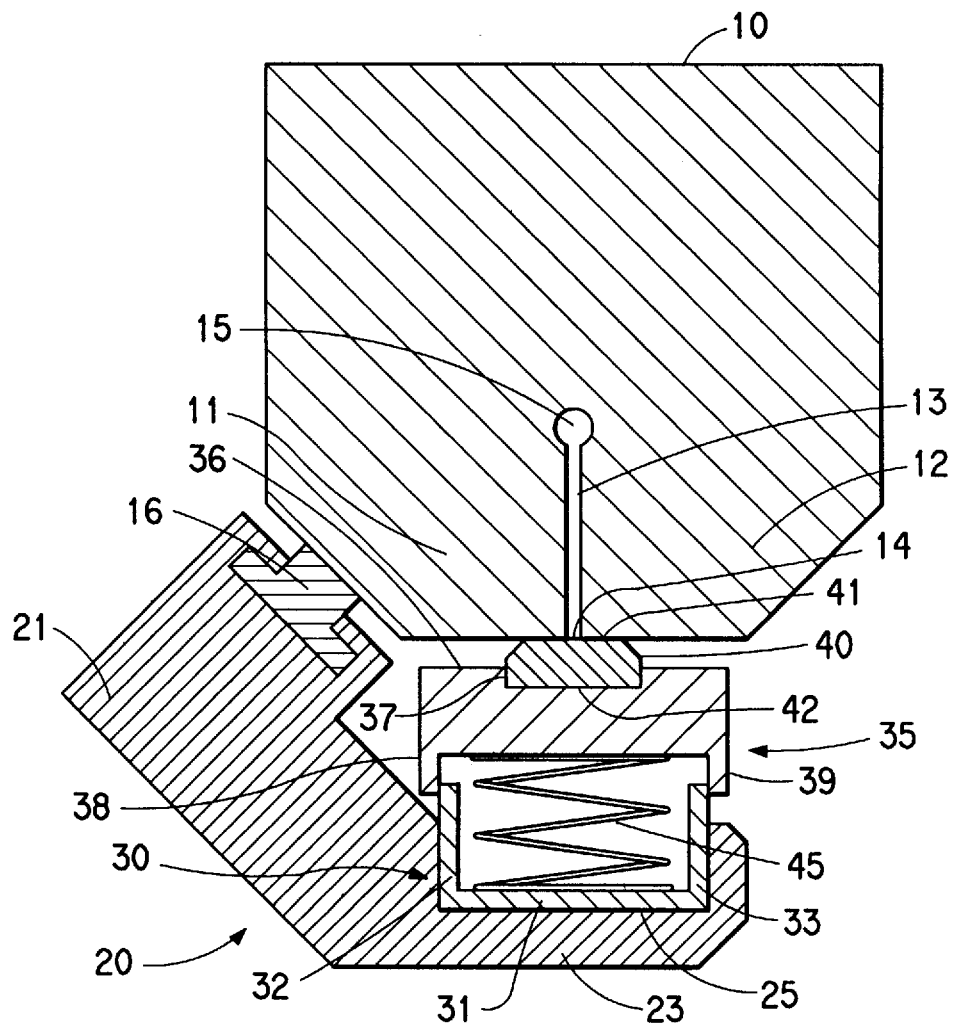
FIG. 1 is a cross-sectional view of a die equipped with the adjustable, leak-free sealing device described herein.

Referring to FIG. 1, die 10 comprises a pair of lips 11 and 12 located opposite of one another and terminating to define die orifice 14. The distance between lips 11 and 12 is lip gap 13. Typically, one of the lips is a fixed lip and the other lip is an adjustable lip such that the lip gap can be adjusted. Die 10 further comprises flow channel 15, which is in communication with die orifice 14. Molten polymer is distributed throughout the die by the flow channel and flows out of the die orifice to form a sheet having a thickness approximately equal to the lip gap.

Figure 2:
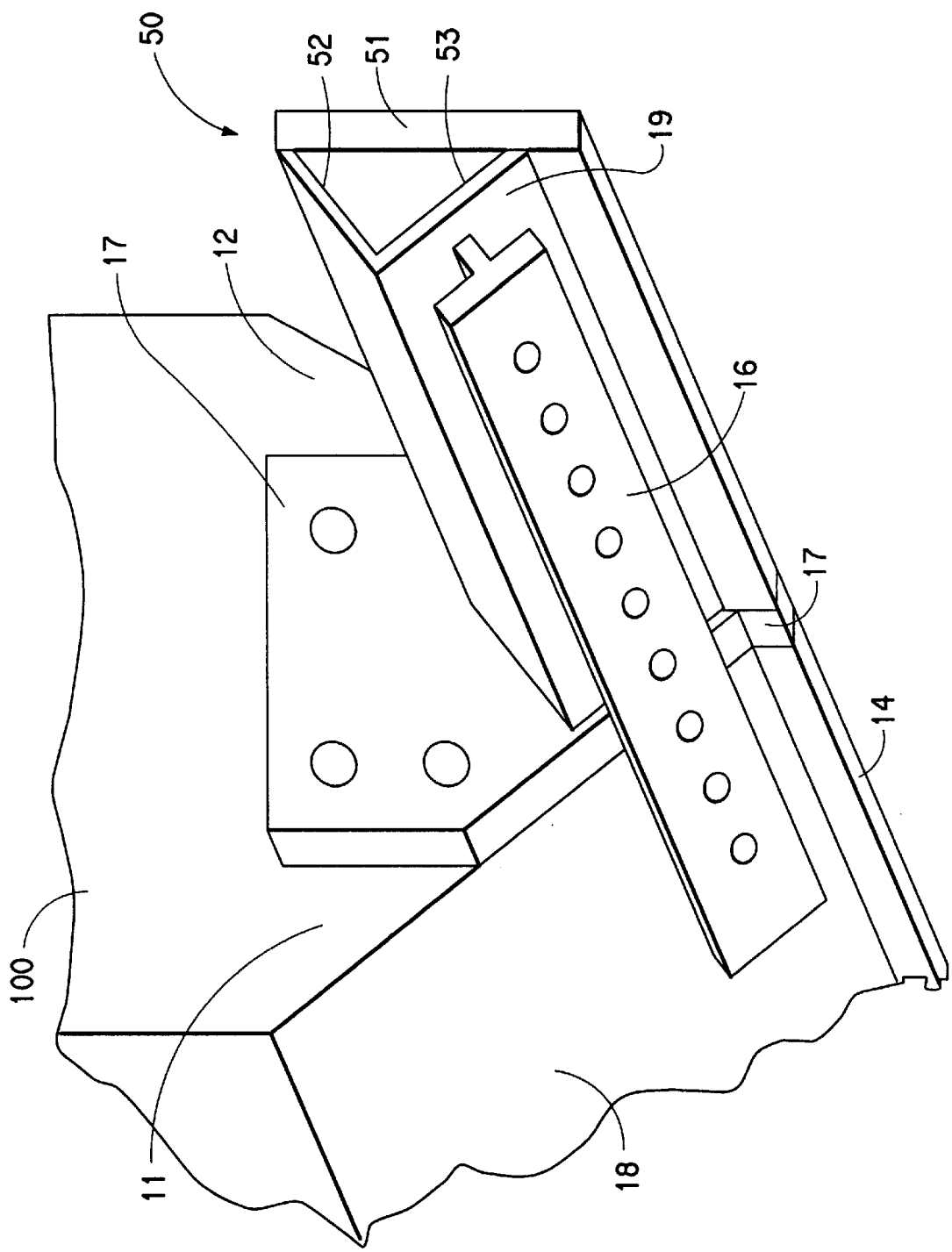
FIG. 2 is a perspective view of a die equipped with the die extension and slide rail described herein.

Sealing device 20 comprises deckle holder 21, sealing bar 40, and a plurality of springs 45. Deckle holder 21 is slideably connected to the die, preferably though use of slide rail 16 mounted parallel to die orifice 14, as shown in FIG. 2. Other known slide mechanisms may be substituted for the slide rail. Preferably, the deckle holder is mounted externally from a single side of the die, and most preferably, the deckle holder is mounted to the fixed lip rather than the adjustable lip. A single sealing device may be used to block one end of the die orifice. Preferably, a pair of sealing devices is used to block both ends of the die orifice, whereby the polymer sheet is drawn from the center of the die.

The preferred deckle holder 21, as shown in FIG. 6, is an angled member having an upper end portion 22 and a lower end portion 23. The upper end portion 22 has a groove 24 conforming to the cross-sectional shape of slide rail 16 such that the deckle holder slides along the slide rail upon mounting. The deckle holder extends from the slide rail and terminates under die orifice 14 such that upper surface 25 of end portion 23 is positioned beneath and parallel to the die orifice.

A plurality of springs 45 are seated on upper surface 25 of deckle holder 21. In a preferred embodiment shown in FIG. 1, spring holder 30 is mounted atop upper surface 25 of deckle holder 21. Spring holder 30 is preferably a rectangular trough having a base 31 and a pair of opposing walls 32 and 33 extending perpendicular to the base and running the length of the spring holder. The springs are seated in the spring holder and walls 31 and 32 hold the springs in place and prevent shifting.

Sealing bar 40, shown in FIG. 5, comprises upper sealing surface 41 and bottom surface 42 and preferably has a trapezoidal-like cross-section wherein the upper sealing surface is narrower than the bottom surface. Referring to FIGS. 1 and 4, upper sealing surface 41 of sealing bar 40 is seated against a portion of die orifice 14 and bottom surface 42 is connected to springs 45, whereby the springs bias the sealing bar against a portion of the die orifice such that the upper sealing surface provides a leak-free seal along a portion of the die orifice.

In a preferred embodiment shown in FIG. 1, sealing bar holder 35 is interposed between sealing bar 40 and springs 45. Sealing bar holder 35 is preferably an inverted rectangular trough having a base 36 and a pair of opposing walls 38 and 39 extending perpendicular to the base and running the length of the sealing bar holder. The distance between the insides of walls 38 and 39 should be slightly greater than the distance between the outsides of walls 32 and 33 of spring holder 30, such that sealing bar holder 35 fits over spring holder 30 like a cap. Base 36 has a longitudinal groove 37 wherein the groove is sized to receive bottom surface 42 of sealing bar 40. It is to be understood that the use of the spring holder and sealing bar holder is a preferred embodiment, and that the springs may directly contact either the deckle holder, the sealing bar, or both.

Referring to FIG. 4, polymer sheet 18 exits the unsealed portion of die orifice 14. Abutting edge 43 of sealing bar 40 bounds polymer sheet 18, thereby defining sheet edge 19. Generally, bottom surface 42 of sealing bar 40 is perpendicular to sheet edge 19, and bottom surface 42 and upper sealing surface 41 of sealing bar 40 are of different lengths, thereby defining angle 44 in relation to sheet edge 19. When bottom surface 42 is longer than upper sealing surface 41, angle 44 is referred to as a negative angle. When upper sealing surface 41 is longer than bottom surface 42, angle 44 is referred to as a positive angle. Angle 44 may be varied in response to the particular polymer and operating conditions in order to minimize the amount of polymer that sticks to the abutting edge of the sealing bar. Preferably, angle 44 is a negative angle, and most preferably, angle 44 is about negative 10°.

Sealing bar 40 preferably comprises a carbon fiber reinforced polytetrafluoroethylene, such as the material sold under the trademark ZYMAXX® by E. I. du Pont de Nemours and Company of Wilmington, Del. Other suitable materials include glass fiber reinforced polytetrafluoroethylene, metal reinforced polytetrafluoroethylene, polyaryl ether ketone, glass fiber reinforced polyaryl ether ketone, and carbon fiber reinforced polyaryl ether ketone. Polyaryl ether ketone is sold under the trademark TECAPEEK® by the Ensinger GmbH & Co. of Nufringen, Germany.

The number of springs required to bias the sealing bar against the die orifice is based upon the die orifice outlet pressure. Polymer exits the die orifice under pressure, and thus a downward force is exerted by the polymer upon the sealing bar when a portion of the die orifice is blocked. The polymer force is calculated by multiplying the maximum possible die pressure by the area of upper sealing surface 41, and including the appropriate safety factor. In order to provide a leak-free seal, the biasing force exerted by the springs must be equal to or greater than the polymer force.

Using the polymer force as the basis, the number of springs can be back calculated by determining the force of each spring as a function of spring deflection. The spring deflection is defined as the distance between the deckle holder and the sealing bar, or in the preferred embodiment, between the bar holder and the spring holder. The spring deflection can be varied by changing the thickness of the spring holder or bar holder, changing the dimensions of the deckle holder, or inserting shims between the deckle holder and sealing bar.

Disc springs are preferred as they are easily layered in columns to exert the required force. Other suitable springs include but are not limited to coil springs, helical springs, and compression springs of variable cross sections and geometries. The springs may be of any material suitable for the particular operating conditions.

Figure 3:
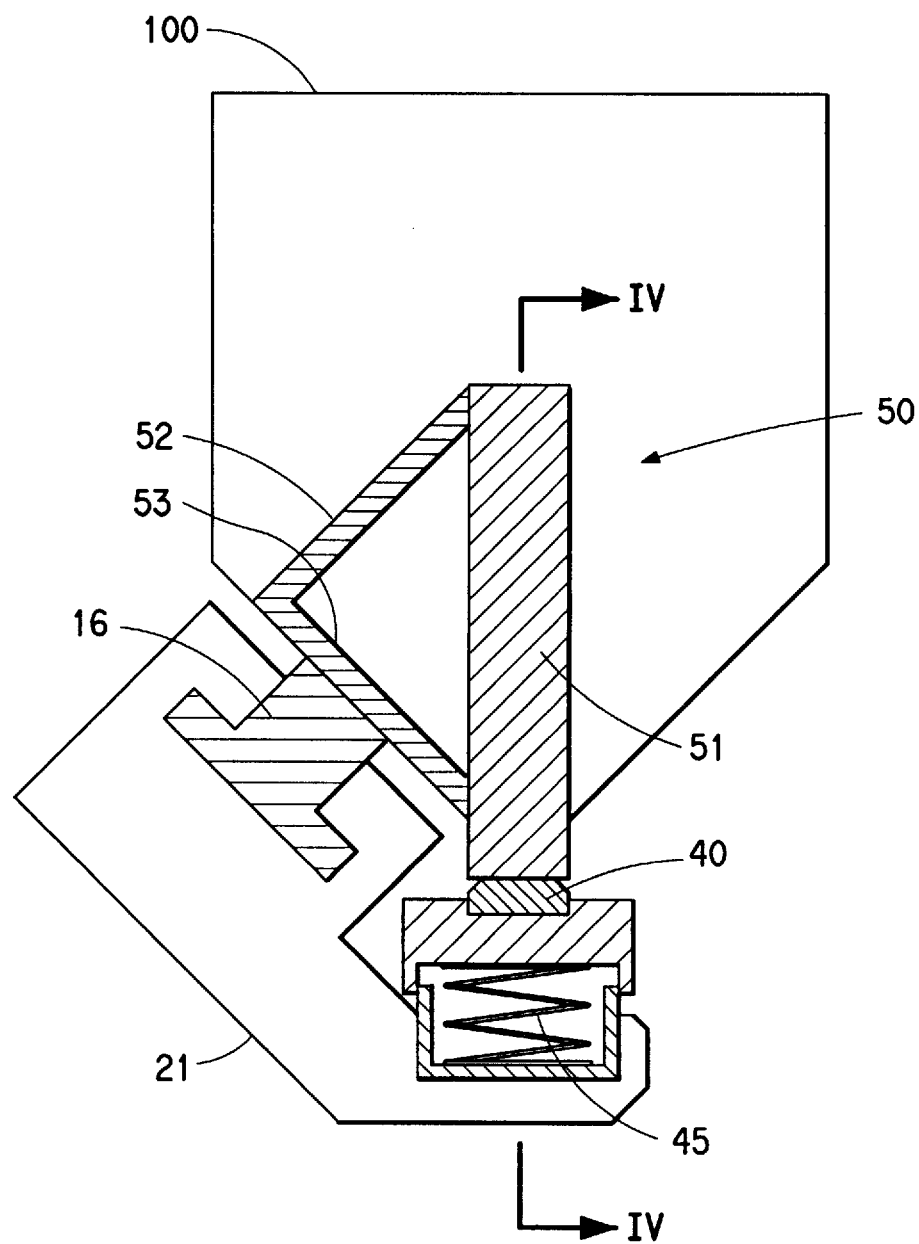
FIG. 3 is a cross-sectional view of a die equipped with the die extension and adjustable, leak-free sealing device described herein.

A preferred embodiment includes die extension 50, as shown in FIGS. 2, 3 and 4, connected to an end of die 100. Die extension 50 comprises a horizontal member 51 and side members 52 and 53 connected to form a triangular cross-section. Die extension 50 is connected at a right angle to end plate 17 such that the die extension extends substantially perpendicular to the end plate, the bottom edge of horizontal member 51 lies in substantially the same plane as die orifice 14, and face 19 of side member 53 lies in substantially the same plane as face 18 of die lip 11. Slide rail 16 extends parallel to face 18 of die lip 11 and is connected to face 19 of side member 53. Polymer exiting the die orifice pushes against the sealing bar and results in the sealing device being subjected to a rotation moment. The die extension secures the slide rail and prevents rotational movement and lateral deflection of the sealing device, thereby providing a leak-free seal.

The sealing device described herein is easily adopted into an automated system whereby the width and thickness of the polymer sheet exiting the die are computer controlled. The springs bias the sealing bar against the die orifice with a constant force and there is no need to manually loosen and tighten set screws prior to and after making a sheet width adjustment. Furthermore, the spring force can be calculated such that the spring force and polymer force are equal. The force equilibrium and the low friction of polytetrafluoroethylene result in the sealing bar easily moving along the slide rail by a driving means such as a servo motor, and thereby changing the sheet width. An electric servo motor is preferred as it is easily controlled and readily attached to a computer control means, but other drivers such as pneumatic or hydraulic motors may be employed. By combining the automated sealing device described above with known computer control systems for die gap adjustment, on-line computer control of both the sheet width and thickness are achieved.

A positioning means may be mounted on the deckling system and connected to the computer control means, such that the location of the sealing bar in relation to the die orifice is transmitted to the computer. The positioning means preferably includes path detection and measurement, digital or analog output, and a limit switch to prevent the sealing device from being driven beyond operating limits.

Various modifications and alterations of the present invention will become apparent to those skilled in the art without departing from the scope and spirit of this invention.

What is claimed is:

1. An adjustable, leak-free sealing device for sealing an extrusion die having a pair of lips forming a die orifice from which molten polymer is drawn to form a polymer sheet, comprising:
    a) a sealing bar seated against a portion of said die orifice, an edge of said sealing bar abutting said polymer sheet;
    b) a deckle holder slideably connected to one side of the die, said deckle holder extending under said die orifice; and
    c) a plurality of springs seated on said deckle holder and biasing said sealing bar against a portion of said die orifice, said springs having a combined spring force equal to or greater than the die orifice outlet pressure such that said sealing bar provides a leak-free seal along a portion of said die orifice.

2. The sealing device of claim 1 wherein said sealing bar comprises carbon fiber reinforced polytetrafluoroethylene.

3. The sealing device of claims 1 or 2 wherein said abutting edge of said sealing bar has a negative slope.

4. The sealing device of claim 3 wherein said negative slope is about 10°.

5. The sealing device of claim 1 wherein said springs are selected from the group consisting of coil springs, helical springs, compression springs, and disc springs.

6. The sealing device of claim 1 further comprising:
    d) a means for driving connected to said deckle holder such that said driving means slides said deckle holder, thereby moving said sealing bar along said die orifice and changing the width of the polymer sheet exiting the die; and
    e) a means for computer control connected to said driving means, said computer control means communicating with said driving means such that the width of the polymer sheet is controlled.

7. The sealing device of claim 6 wherein said means for driving is a servo motor.

8. The sealing device of claim 6 further comprising:
    f) a means for indicating the position of said deckle holder mounted on said sealing device and connected to the computer control means such that the location of the sealing bar in relation to the die orifice is transmitted to the computer control means.

9. The sealing device of claims 1 or 8 further comprising:
    g) a die extension connected to an end of said die, said die extension positioned at a right angle from the end of said die and parallel to said die lips, said deckle holder connected to said die extension such that a rotation moment exerted by the polymer against the sealing bar is offset, thereby providing a leak-free seal.

10. A method of controlling on-line the width and thickness of a sheet of polymer exiting a die orifice, comprising:
    (a) supplying a die having a fixed lip and an adjustable lip, said fixed lip and said adjustable lip defining a lip gap extending the length of the die orifice;
    (b) modifying the die to include:
        (i) a sealing bar seated against a portion of said die orifice, an edge of said sealing bar abutting said polymer sheet;
        (ii) a deckle holder slideably connected to one side of the die, said deckle holder extending under said die orifice; and
        (iii) a plurality of springs seated on said deckle holder and biasing said sealing bar against a portion of said die orifice, said springs having a combined force equal to or greater than the die orifice outlet pressure such that said sealing bar provides a leak-free seal along a portion of said die orifice;
    (c) integrating the adjustable lip and the sealing device with a computer; and
    (d) entering a desired sheet width and thickness into the computer, whereby the computer monitors and adjusts the width of the sheet by sliding the sealing bar along the die orifice and the thickness of the sheet by adjusting the lip gap such that the desired sheet width and thickness are obtained.

* * * * *